United States Patent
Olek et al.

(10) Patent No.: US 6,908,686 B2
(45) Date of Patent: Jun. 21, 2005

(54) PEN-PET-PEN POLYMERIC FILM

(75) Inventors: Anton Richard Olek, Cleveland (GB); Christopher Charles Naylor, deceased, late of Warwickshire (GB); by Valerie M. Naylor, legal representative, Warwickshire (GB)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 0 days.

(21) Appl. No.: 10/304,970

(22) Filed: Nov. 26, 2002

(65) Prior Publication Data

US 2004/0101701 A1 May 27, 2004

(51) Int. Cl.⁷ .................... B32B 27/08; B32B 27/36; B32B 31/30
(52) U.S. Cl. ............... 428/480; 428/212; 428/910; 156/244.11; 264/173.11
(58) Field of Search ................. 428/480, 212, 428/910; 156/244.11; 264/173.11; 174/137 R, 110 R, 100 SR, 110 PM

(56) References Cited

U.S. PATENT DOCUMENTS

| | | | | |
|---|---|---|---|---|
| 5,427,842 A | * | 6/1995 | Bland et al. | 428/213 |
| 5,441,800 A | | 8/1995 | Utsumi | |
| 5,486,949 A | * | 1/1996 | Schrenk et al. | 359/498 |
| 5,604,019 A | * | 2/1997 | Bland et al. | 428/212 |
| 5,783,283 A | * | 7/1998 | Klein et al. | 428/141 |
| 5,882,774 A | * | 3/1999 | Jonza et al. | 428/212 |
| 5,968,666 A | * | 10/1999 | Carter et al. | 428/480 |
| 6,045,894 A | * | 4/2000 | Jonza et al. | 428/212 |
| 6,054,224 A | * | 4/2000 | Nagai et al. | 428/480 |
| 6,368,699 B1 | * | 4/2002 | Gilbert et al. | 428/212 |
| 6,787,219 B2 | * | 9/2004 | Peiffer et al. | 428/212 |
| 2002/0037418 A1 | * | 3/2002 | Peiffer et al. | 428/458 |

FOREIGN PATENT DOCUMENTS

| | | |
|---|---|---|
| EP | 0 844 519 A1 | 5/1998 |
| EP | 0 849 075 A2 | 6/1998 |
| JP | A 50/040682 | 4/1975 |
| JP | A 50/062286 | 5/1975 |
| JP | A 50/066578 | 6/1975 |
| JP | A 60/228149 | 11/1985 |
| JP | 63017023 | 9/1988 |
| JP | 63197643 | 6/1989 |
| JP | A 01/264843 | 10/1989 |
| JP | A 3/112079 | 10/1989 |
| JP | 3096343 | 4/1991 |
| JP | A 05/131600 | 11/1991 |
| JP | A 04/301447 | 10/1992 |
| JP | A 05/104618 | 4/1993 |
| JP | A 05/131602 | 5/1993 |
| JP | 05269842 | 10/1993 |
| JP | 06210722 | 8/1994 |
| JP | A 06/238746 | 8/1994 |
| JP | A 08/309946 | 5/1995 |
| JP | A 09/187905 | 11/1995 |
| JP | A 09/156056 | 12/1995 |
| JP | A 09/157420 | 12/1995 |
| JP | A 09/2868867 | 2/1996 |
| JP | A 09/300565 | 5/1996 |
| JP | A 9/99530 | 4/1997 |
| JP | A 10/304614 | 11/1998 |
| JP | 10304614 | 11/1998 |
| JP | A 10/338757 | 11/1998 |
| WO | WO 95/17303 | 6/1995 |
| WO | WO 97/32724 | 3/1996 |
| WO | WO 97/01440 * | 1/1997 |
| WO | WO 97/32726 | 9/1997 |
| WO | WO 01/96107 A2 | 12/2001 |

OTHER PUBLICATIONS

Research Disclosure 29410, Poly(Ethylene Naphthalenedicarboxylate)Poly(Ethylene Terephthalate) Blends, Oct. 1988; pp. 714–719.

Research Disclosure 28441, Real Time Control of Photo Exposure Dose, Dec. 1987, pp. 779–782.

* cited by examiner

*Primary Examiner*—Vivian Chen

(57) ABSTRACT

A polymeric film comprising a first layer which comprises (a) a mixture comprising 50–99.9% by weight polyethylene terephthalate (PET) and 0.1–50% by weight of polyethylene naphthalate (PEN) or (b) a copolymer comprising 50–99.9% by weight ethylene terephthalate units and 0.1–50% by weight ethylene naphthalate units, based on the total weight of the first layer, further comprising a second layer comprising PEN and a third layer comprising PEN, and further comprising a first intermediate layer and a second intermediate layer, wherein each of said intermediate layers comprises (a) a mixture comprising 50–99.9% by weight polyethylene terephthalate (PET) and 0.1–50% by weight polyethylene naphthalate (PEN) or (b) a copolymer comprising 50–99.9% by weight ethylene terephthalate units and 0.1–50% by weight ethylene naphthalate units, based on the total weight of the layer, and wherein the first intermediate layer is interposed between the first and second layers and the second intermediate layer is interposed between the first and third layers. The invention further relates to a method of producing such a polymeric film. The polymeric film can be used as insulation in an electric motor or generator and in a magnetic medium or in packaging material.

12 Claims, No Drawings

PEN-PET-PEN POLYMERIC FILM

BACKGROUND OF THE INVENTION

The present invention is directed towards polymeric films comprising polyethylene terephthalate (PET) and in particular to a film for use as an electric insulator.

Polyester films, particularly films comprising polyethylene terephthalate, have been used in industrial applications such as electrical applications, where the films operate as insulator materials, e.g. in electric motors and electric capacitors. In such electrical applications, the polyester films are subject to relatively high temperatures for long periods of time. Unfortunately, commercially available polyester films are susceptible to thermal ageing which can result in an unacceptable reduction in the efficiency of the films as electrical insulators. Thus, there is a commercial need for polyester films exhibiting improved thermal ageing characteristics.

However, improvements in thermal ageing can result in polyester films displaying an increased tendency to delaminate in-plane, when used as electrical insulators. Ideally, polyester films possessing improved thermal ageing, which are not susceptible to in-plane delamination are required.

Polyester films are known to contain relatively small amounts of low molecular weight organic materials, or oligomers. The oligomers are extracted from the polyester film, for example when used to insulate sealed motors, and can cause problems by being deposited elsewhere in the system.

It is known, for instance from JP63-197643 (Teijin Ltd) to reduce the potential for oligomer extraction from a PET film by using, in particular for magnetic recording media, a composite three-layer polyester film comprising a core layer of PET and outer layers of polyethylene naphthalate (PEN). However, such a composite film is susceptible to delamination of the PEN and PET layers.

It is furthermore known from JP5-131602 (Teijin Ltd) to use a layer comprising a copolymer of polyester (A) and polyester (B) between a laminate of a film layer of polyester (A) and a film layer of polyester (B) in order to prevent layer separation in magnetic media applications. However, in their simplest form such laminates have a film layer comprising PET exposed to the outside environment and consequently give rise to potential oligomer extraction from such a layer.

Surprisingly, it has now been found that a polymeric film can be devised which reduces or substantially overcomes one or more of the aforementioned problems.

SUMMARY OF THE INVENTION

According to the present invention there is provided a polymeric film comprising a first layer which comprises (a) a mixture comprising 50–99.9% by weight polyethylene terephthalate (PET) and 0.1–50% by weight of polyethylene naphthalate (PEN) or (b) a copolymer comprising 50–99.9% by weight ethylene terephthalate units and 0.1–50% by weight ethylene naphthalate units, based on the total weight of the first layer, further comprising a second layer comprising PEN and a third layer comprising PEN, and further comprising a first intermediate layer and a second intermediate layer, wherein each of said intermediate layers comprises (a) a mixture comprising 50–99.9% by weight polyethylene terephthalate (PET) and 0.1–50% by weight polyethylene naphthalate (PEN) or (b) a copolymer comprising 50–99.9% by weight ethylene terephthalate units and 0.1–50% by weight ethylene naphthalate units, based on the total weight of the layer, and wherein the first intermediate layer is interposed between the first and second layers and the second intermediate layer is interposed between the first and third layers.

In one embodiment, the first layer comprises a copolymer comprising 50–99.9% by weight ethylene terephthalate units and 0.1–50% by weight ethylene naphthalate units. Preferably, the first layer comprises a copolymer comprising 70–99.9% by weight ethylene terephthalate units and 0.1 to 30% by weight ethylene naphthalate units, more preferably a copolymer comprising 85 to 99.5% ethylene terephthalate units and 0.5 to 15% by weight ethylene naphthalate units, based on the total weight of the layer.

In a preferred embodiment, one or both, preferably both, of the first and second intermediate layers comprise a copolymer comprising 50–99.9% by weight ethylene terephthalate units and 0.1–50% by weight ethylene naphthalate units, preferably, the first layer comprises a copolymer comprising 70–99.9% by weight ethylene terephthalate units and 0.1 to 30% by weight ethylene naphthalate units, more preferably a copolymer comprising 85 to 99.5% ethylene terephthalate units and 0.5 to 15% by weight ethylene naphthalate units, based on the total weight of the layer.

Where the first layer and/or the first intermediate layer and/or the second intermediate layer comprises a mixture of PEN and PET polymers, said mixture preferably comprises 0.1 to 30%, more preferably 0.5–15% by weight of PEN, based on the total weight of the layer.

If less than 0.5%, and in particular less than 0.1% by weight of ethylene naphthalene units or of PEN is present, delamination may occur. In order to retain the desirable properties of PET and for reasons of economy, not more than 50% by weight of ethylene naphthalate units or of PEN should be present in the layer, preferably not more than 30% by weight and more preferably not more than 15% by weight which is in most cases sufficient to obtain the desired strength and other properties of the polymeric film.

The composition of the first layer may be the same or different from the composition of the first and second intermediate layers. The composition of the first intermediate layer may be the same or different, preferably the same, as the composition of the second intermediate layer.

Preferably, the amount of PEN in the second layer is at least about 95%, more preferably at least about 98%, more preferably at least about 99% and most preferably substantially 100% by weight of the total polyester or polymeric material in the second layer.

Preferably, the amount of PEN in the third layer is at least about 95%, more preferably at least about 98%, more preferably at least about 99% and most preferably substantially 100% by weight of the total polyester or polymeric material in the third layer.

In one embodiment the third layer, and optionally also the second layer, consists essentially of PEN.

DETAILED DESCRIPTION

Polyesters described herein can be synthesised by conventional methods. A typical process involves a direct esterification or ester exchange reaction, followed by polycondensation. It is preferred that polycondensation includes a solid phase polymerisation stage. The solid phase polymerisation may be carried out on a fluidised bed, e.g. fluidised with nitrogen, or on a vacuum fluidised bed, using a rotary vacuum drier.

A polyester film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a polyester tube which is subsequently quenched, reheated and then expanded by internal gas pressure to induce transverse orientation, and withdrawn at a rate which will induce longitudinal orientation. Simultaneous biaxial stretching may also be effected in a stenter process by extruding the polyester material as a flat extrudate which is subsequently stretched in one direction and in the mutually perpendicular direction at the same time. Sequential stretching may be effected in a stenter process by extruding the polyester material as a flat extrudate which is subsequently stretched first in one direction and then in the other mutually perpendicular direction. Generally, it is preferred to stretch firstly in the longitudinal direction, i.e. the forward direction through the film stretching machine, and then in the transverse direction. A stretched polyester, particularly polyethylene terephthalate, film may be, and preferably is, dimensionally stabilised by heat setting under dimensional restraint at a temperature above the glass transition temperature thereof, preferably in the range from 200° C. to 225° C.

A range of antioxidants may preferably be used in the first layer, and additionally in the second layer and/or third layer and/or first intermediate layer and/or second intermediate layer, such as antioxidants which work by trapping radicals or by decomposing peroxide. Suitable "radical trapping" antioxidants include hindered phenols, secondary aromatic amines and hindered amines, e.g. "Tinuvin 770" (obtained from Ciba-Geigy). Preferred "peroxide decomposing" antioxidants are trivalent phosphorous compounds, e.g. phosphonites, phosphites, such as triphenyl phosphite, trialkylphosphites; and thiosynergists, e.g. esters of thiodipropionic acid such as dilauryl thiodipropionate. Hindered phenol antioxidants are preferred, a particularly preferred hindered phenol is tetrakis-(methylene 3-(4'-hydroxy-3', 5'-di-t-butylphenyl propionate) methane, which is commercially available as "Irganox 1010" (obtained from Ciba-Geigy). Other suitable commercially available hindered phenols include "Irganox 1035, 1076, 1098 and 1330" (obtained from Ciba-Geigy), "Santanox R" (obtained from Monsanto), "Cyanox" antioxidants (obtained from American Cyanamid) and "Good-rite" antioxidants (obtained from BF Goodrich).

The concentration of antioxidant present in the polyester film is preferably in the range from 50 ppm to 5000 ppm, more preferably in the range from 300 ppm to 1500 ppm, particularly in the range from 400 ppm to 1200 ppm, and especially in the range from 450 ppm to 600 ppm. A mixture of more than one antioxidant may be used, in which case the total concentration thereof is preferably within the aforementioned ranges. In one embodiment, the anti-oxidants are present only in the first and second and/or third layers.

Incorporation of the antioxidant into the polyester may be effected by conventional techniques—preferably, by mixing with the reactants from which the polyester is derived, particularly at the start of the direct esterification or ester exchange reaction, prior to polycondensation.

The PET used to prepare the film according to the invention suitably has an intrinsic viscosity (IV) of 0.65–1.5 (measured as described hereinafter), preferably 0.7–1.5, and in particular 0.8–1.1. An IV of less than 0.65 results in a polymeric film lacking desired properties such as thermal stability whereas an IV of greater than 1.5 is difficult to achieve and would likely lead to processing difficulties of the raw material.

The PEN used to prepare the film according to the invention suitably has an IV of 0.5–1.5, preferably 0.7–1.5, and in particular 0.9–1.4, for the same reasons as described herein before.

The PEN-PET copolymers used to prepare the film according to the invention suitably have an IV of 0.5–1.5, preferably 0.7–1.5, and in particular 0.9–1.4, for the same reasons as described herein before.

The PEN and PET polymers and PEN/PET copolymers used in the present invention are preferably crystallisable in order to provide a polymeric film having crystalline layers. In particular, it is preferred that the first layer is crystalline. Preferably, the first and/or second intermediate layers are crystalline. Preferably, the second and third layers are crystalline.

Reference herein to a crystalline layer includes reference to a partially crystalline or semi-crystalline polymeric layer. In one embodiment, reference herein to a polymeric crystalline layer is to a layer in which at least 5%, preferably at least 10%, preferably at least 15%, and preferably at least 20% of the total layer volume comprises ordered crystalline regions, i.e. no more than 95%, preferably no more than 90%, preferably no more than 85% and preferably no more than 80% of the total layer volume comprises amorphous regions. In an alternative embodiment, reference herein to a crystalline layer refers to a layer having a crystallinity index measured by differential scanning calorimetry (a "DSC crystallinity index", measured as described herein) of at least 5%, preferably at least 10%, more preferably at least 15%, and more preferably at least 20%. In a further alternative embodiment, reference herein to a crystalline layer refers to a layer having a crystallinity index measured by X-ray diffraction (an "XRD crystallinity index", measured as described herein) of at least 5%, preferably at least 10%, more preferably at least 15%, and more preferably at least 20%.

Polymeric films according to the present invention are suitably used as insulation in an electric motor or generator because of their resistance to thermal ageing and relatively low organic extractable content of the outer (second and third) layers exposed to the environment. The excellent compatibility between the layers reduces delamination of these layers.

Preferably, the present polymeric film has an accelerated thermal ageing half life at 180° C. of at least 300 hours with mechanical testing carried out according to ASTM D882-83 and further described hereinafter.

The overall film according to the present invention preferably has an organic extractable content of less than 0.5% by weight, based on the total weight of the film. An organic extractable content of 0.5% by weight or more is likely to result in undesirable extraction of organic compounds such as oligomers, which may be deposited in undesirable places, in particular when polymeric films are used to insulate sealed motors.

The invention further relates to a method of producing a polymeric film comprising providing a first layer which comprises (a) a mixture comprising 50–99.9% by weight polyethylene terephthalate (PET) and 0.1–50% by weight polyethylene naphthalate (PEN) or (b) a copolymer comprising 50–99.9% by weight ethylene terephthalate units and 0.1–50% by weight ethylene naphthalate units, based on the total weight of the first layer, further providing a second layer comprising PEN and a third layer comprising PEN, and further providing a first intermediate layer and a second intermediate layer, wherein each of said intermediate layers comprises (a) a mixture comprising 50–99.9% by weight polyethylene terephthalate (PET) and 0.1–50% by weight polyethylene naphthalate (PEN) or (b) a copolymer comprising 50–99.9% by weight ethylene terephthalate units and 0.1–50% by weight ethylene naphthalate units, based on the total weight of the layer, and wherein the first intermediate layer is interposed between the first and second layers and the second intermediate layer is interposed between the first and third layers.

The polymeric film of the present invention is preferably opaque. The polymeric film is conveniently rendered opaque by incorporating an opacifying agent therein, such as a particulate inorganic filler. Suitable "opacifying" particulate inorganic fillers include conventional inorganic pigments and fillers, and particularly metal or metalloid oxides, such as alumina, titania and alkaline metal salts, such as the carbonates and sulphates of calcium and barium.

The opacifying inorganic fillers may be of the voiding and/or non-voiding type. Suitable inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as pigment, soap, surfactant coupling agent or other modifier to promote or alter the degree to which the filler is compatible with the substrate polymer.

Titanium dioxide is a particularly preferred opacifying inorganic filler.

The opacifying filler, particularly of titanium dioxide, should be finely divided, and the average particle size thereof is desirably from 0.01 to 10μm, and particularly of from 0.15 to 0.3μm.

The amount of opacifying filler, particularly of titanium dioxide, incorporated into the film preferably should be in the range from 0.05% to 2%, more preferably in the range from 0.1% to 1%, and especially in the range from 0.2% to 0.4%, by weight of the polyester material.

In addition to the opacifying inorganic filler, the polymeric film according to the invention may comprise a particulate inorganic filler which primarily endows handling properties on the film. The "handling" inorganic filler may be selected from silica, silicates, ground glass, chalk, talc, china clay, zeolite, magnesium carbonate, zinc oxide, zirconia or calcium carbonate. Silica is a preferred handling filler, preferably present in the range from 0.05% to 2%, more preferably in the range from 0.1% to 1%, and especially in the range from 0.2% to 0.4%, by weight of the polyester material.

The handling filler preferably has an average particle size of from 0.1 to 10 μm, more preferably of from 1 to 8 μm, and particularly of from 3 to 5 μm.

Particle sizes may be measured by electron microscope, coulter counter or sedimentation analysis and the average particle size may be determined by plotting a cumulative distribution curve representing the percentage of particles below chosen particle sizes.

It is preferred that none of the filler particles incorporated into the polyester film according to this invention should have an actual particle size exceeding 30 μm. Particles exceeding such a size may be removed by sieving processes which are known in the art. However, sieving operations are not always totally successful in eliminating all particles greater than a chosen size. In practice, therefore, the size of 99.9% by number of the particles should not exceed 30 μm. Most preferably the size of 99.9% of the particles should not exceed 20 μm.

Incorporation of the filler(s) into the polyester may be effected by conventional techniques—for example, by mixing with the monomeric reactants from which the polyester is derived, or by dry blending with the polyester in granular or chip form prior to formation of a film therefrom. The filler(s) may be present in any or all of the various layers of the film.

Total thickness of the polyester film may vary depending of the envisaged application but, in general will be more than about 0.1 μm, will not exceed about 500 μm, will preferably be in a range from about 40 to about 400 μm, and more preferably be in a range from about 125 to about 350 μm.

The second and third layers preferably each have a thickness of about 0.01–35 μm. A thickness of less than 0.01 μm is difficult to achieve technically and could result in undesirable diffusion of organic material from the first layer and/or the intermediate layers through the second and/or third layer. A thickness of more than 35 μm for the second and/or third layer would make the resulting polymeric film relatively expensive without providing much additional benefit with respect to thermal ageing or organic extractables.

The first and second intermediate layers preferably each have a thickness of about 0.01 to 35 μm, preferably 0.01 to 15 μm and more preferably 0.01–5 μm. A thickness of less than 0.0 μm is difficult to achieve technically and could result in undesirable reduction of interlaminar adhesion between the first and second layers, and/or between the first and third layers. A thickness of more than 5 μm, particularly more than 15 μm and especially more than 35 μm for the first and second intermediate layers would make the resulting polymeric film relatively expensive without providing much additional benefit with respect to interlaminar adhesion between the first and second layers, and/or between the first and third layers.

It is preferred that each of the first intermediate layer and/or the second intermediate layer are thinner than each of the second and third layers.

The film according to the invention can be manufactured by any method known in the art. Multi-layer films can be made by either coextrusion or multi-manifold die. Other possible methods are lamination such as adhesive lamination. Co-extrusion is a preferred method.

The following test procedures were used.

Thermal Ageing

Accelerated thermal ageing was performed at 180° C. in a circulating air oven. The half life, in days, of the percentage elongation to break (ETB) of the film was determined. ASTM D882-83 was used for mechanical testing to determine the % ETB values. Polyester films according to the invention preferably have a half life % ETB of greater than 8 days, more preferably greater than 10 days at 180° C.

Intrinsic Viscosity (IV)

The IV of PET polymers was measured by solution viscometry, by using a 1% by weight solution of polyester in o-chlorophenol at 25° C. The IV of PEN and PEN-PET copolymers were measured by melt viscometry, using the following procedure. The rate of flow pre-dried extrudate through a calibrated die at known temperature and pressure is measured by a transducer which is linked to a computer. The computer programme calculates melt viscosity values ($\log_{10}$ viscosity) and equivalent IVs from a regression equation determined experimentally. A plot of the IV against time in minutes is made by the computer and the degradation rate is calculated. An extrapolation of the graph to zero time gives the initial IV and equivalent melt viscosity. The die orifice diameter is 0.020 inches, with a melt temperature of 284° C. for IV up to 0.80, and 295° C. for IV>0.80.

Organic Extractable Content

Measured by using a solvent extraction method. A sample of film was placed in a soxhlet extraction thimble, and extracted with refluxing xylene for 24 hours. The film sample was removed, the xylene solution was evaporated to dryness and the total amount of organic compounds extracted was calculated, being expressed as a percentage of the initial film sample weight.

Peel Strength Test Method

Such a method is described in 'The peeling of flexible laminates', by A J Kinloch, C C Lau, J G Williams, International Journal of Fracture No. 66, 1994, pages 45–70. This article describes a Protocol for the determination of the Interfacial Work of Fracture ($G_A$) by Peel Testing of Flexible Laminates. The following is a description of the method used to generate the peel strength data presented in this document. Adhesive tape is secured to one surface of the film such that one end of the tape extends beyond an edge of the film. The other surface of the film is firmly attached to the base plate of the test jig. The latter is attached to an Instron or similar universal testing machine such that the peel angle remains constant for the duration of the test. The free end of the adhesive tape is fixed to the Instron jaw which, when set in motion, will begin the peel test. For the materials tested, a jaw separation speed of 10 mm/minute and a peel angle of 110° was used. A software package was used to calculate $G_A$. The interfacial work of fracture ($G_A$) for the films of the present invention should be at least 10 $J/m^2$, preferably at least 50 $J/m^2$ and more preferably at least 100 $J/m^2$.

Crystallinity

The morphology of the films may be characterised using differential scanning calorimetry (DSC), for example on a Perkin Elmer DSC7. Thus, a sample of known weight (10 mg) is heated from 30 to 290° C. at 20° C. per minute, held at 290° C. for 2 minutes, then cooled at 20° C. per minute. The results of the DSC scan may be plotted as a graph of heat flow (mW or mJ/s; y-axis) against temperature (x-axis). The crystallinity is measured using the data from the heating portion of the scan. An enthalpy of fusion H (in J/g) for the crystalline melt transition is calculated by determining the area under the graph from the temperature determined just below the start of the main melt transition (endotherm) to the temperature just above the point where fusion is observed to be completed. In order to arrive at a true value for the enthalpy of fusion of the test sample, the calculated H value is corrected, where appropriate, in respect of any additional crystallinity produced by the heating experienced by the sample under the DSC test conditions. Thus, where there is observed an exotherm associated with the production of crystallisation on heating, which occurs with a peak value at a temperature generally referred to as $T_{ch}$ (temperature of crystallisation on heating) or $T_n$ (temperature of nucleation), the enthalpy of this exotherm is subtracted from the enthalpy of the main melt transition endotherm, to obtain a corrected H value. The calculated H (or calculated and corrected H) is then compared to the theoretical enthalpy of fusion ($H_c$ of 120 J/g) determined for 100% crystalline PET at a melt temperature of approximately 250° C. A DSC crystallinity index is expressed as the percentage 100($H/H_c$).

Alternatively, the crystallinity of the films may be measured by X-ray diffraction (XRD). Measurements were made with Siemens D5000 instruments with Cu K-alpha radiation on films approximately 50 microns thick using x-ray diffraction scans between 5° and 60° 2-theta. Measurements may be made in reflection geometry (symmetrical incident and diffracted beam angles with the beam parallel to the specimen surface at 0° 2-theta) or in transmission geometry (symmetrical incident and diffracted beam angles with the beam normal to the specimen surface at 0° 2-theta). Amorphous films exhibit a diffraction effect which is broad and diffuse, i.e. a broad, rounded graph is obtained when the intensity of the diffracted radiation is plotted against 2-theta. Crystalline films containing ordered regions of polymeric molecules produce a more sharp and pronounced diffraction effect, i.e. a plot of intensity versus 2-theta shows sharp well-defined features. Greater crystallinity is indicated by sharper features in the diffraction pattern.

An XRD crystallinity index may be calculated from the x-ray diffraction patterns of the films. Typically the data obtained from transmission scans are used. The area of the diffraction pattern characterising the sharp crystalline features is measured, together with that assigned to the broader non-crystalline features, by a curve-fitting procedure and the XRD crystallinity index taken as the percentage of the total crystalline area relative to the total crystalline and non-crystalline areas.

Crystallinity indices calculated by such procedures do not give absolute values of crystallinity, but produces values that are proportional to crystallinity.

The invention is further illustrated by reference to the following Examples. All parts and percentages are by weight unless otherwise indicated.

EXAMPLES

Three polyesters were used in the manufacture of the multi-layer structures.

Polyester A

Terephthalic acid was reacted with ethylene glycol in the presence of 50 ppm of sodium hydroxide and 500 ppm of Irganox® 1010 antioxidant to form bis-(2-hydroxyethyl) terephthalate and low oligomers thereof, in a standard direct esterification reaction. At the end of the direct esterification reaction 300 ppm of phosphoric acid stabiliser was added, followed by 500 ppm of antimony trioxide polycondensation catalyst. 0.3% silica of particle size 4 µm, and 0.3% of titanium dioxide of particle size 0.2 µm were also added at this stage. A standard batch polycondensation reaction was performed until the intrinsic viscosity (IV) of the polyethylene terephthalate was approximately 0.52. The polyethylene terephthalate was further polymerised by means of a batch solid phase polymerisation process, until the intrinsic viscosity of the polyethylene terephthalate was either approximately 0.75 to 0.79 (polyester A1) or 0.90–1.0 (polyester A2).

Polyester B

Dimethyl naphthalate was reacted with ethylene glycol in the presence of 400 ppm manganese acetate tetrahydrate catalyst to give bis-(2-hydroxyethyl) naphthalate and low oligomers thereof, in a standard ester interchange reaction. At the end of the ester interchange reaction 0.025% of phosphoric acid stabiliser was added, followed by 0.04% of antimony trioxide polycondensation catalyst, and 0.125% of china clay. A standard batch polycondensation reaction was performed until the intrinsic viscosity (IV) of the polyethylene naphthalate was approximately 0.50–0.55 (polyester B 1; true PEN IV, PET equivalent IV 0.75–0.80) or 0.56–0.65 (polyester B2; true PEN IV, PET equivalent 0.83–0.92).

Polyester C

Dimethyl naphthalate and dimethyl terephthalate were reacted with ethylene glycol in the presence of 400 ppm manganese acetate tetrahydrate catalyst to give a bis-(2-hydroxyethyl) monomer with naphthalate and terephthalate groups as well as low oligomers thereof, in a standard ester interchange reaction. At the end of the ester interchange reaction 0.025% of phosphoric acid stabiliser was added, followed by 0.04% of antimony trioxide polycondensation catalyst. A standard batch polycondensation reaction was performed until the intrinsic viscosity (IV) of the copolymer was approximately 0.60–0.65 (PET equivalent IV). The copolymer was further polymerised by means of a batch solid phase polymerisation process, until the intrinsic viscosity (PET equivalent) of the copolymer was either approximately 0.75 to 0.79 (polyester C1) or 0.84–0.95 (polyester C2).

The above polyesters were used in a variety of combinations to give films of 1, 3 or 5 layer structures. In the case of the mono-layer film, dried pellets of PET were extruded through a slot die and rapidly quenched on a chilled casting drum so as to produce an amorphous extrudate. Orientation was then effected by stretching the amorphous extrudate in a 2-stage process, ie first in the longitudinal direction, then in the transverse direction. Stretching the film in the longitudinal direction was accomplished between slow and fast rotating rolls at a temperature just above the glass transition temperature of the PET; subsequent stretching of the film in the transverse direction was effected in a stenter at a temperature slightly higher than that used for the longitudinal draw process. The degree of stretch employed in each of the longitudinal direction and the transverse direction was approximately 3.1 times the original length. The biaxially orientated film was heat set at approximately 225° C. under dimensional restraint.

For the production of the 3-layer films, two extruders were used. The main extruder was used for the PET first layer and a co-extruder was used for the PEN. An additive feeder was employed to add the PEN to the PET in the main extruder. The two extruders were connected to a multi-manifold die which converted the two melt streams into tri-layer structures. For the production of 5-layer films, 3 extruders were used. The main extruder was used for the first layer and a coextruder was used for the first and second intermediate layers. An additive feeder was employed to add the PEN to the PET in the main extruder. A third extruder was used for the PEN second and third layers. The main extruder and the coextruder were connected to an injector block (also known as a feed block) which converted the melt streams into a tri-layer melt stream. This melt stream and the melt stream from the third extruder were separately fed to a multi-manifold die to produce a 5-layer film. The process for the 3- and 5-layer films was then identical to that of the mono-layer film described above. Film thickness was between 100 and 250 μm for all structures.

Example 1 (Comparative)

A tri-layer film was made according to the method given herein using polyester A1 as the core layer and polyester B1 as the surface layers. 5% (w/w) of polyester B1 was homogeneously blended into the core polyester A1 just prior to extrusion using an Engelhardt side feeder. The overall thickness of the film is 125 μm with the surface layers each being of 12 μm thiclkniess. The film was subjected to the test procedures described herein. The results are given in Table 1.

Example 2 (Comparative)

A tri-layer film was made according to example 1 with the exception that the surface layers are each of 6 μm thickness. The film was subjected to the test procedures described herein. The results are given in Table 1.

Example 3 (Comparative)

A tri-layer film was made according to example 1 with the exception that the overall thickness of the film is 230 μm. The film was subjected to the test procedures described herein. The results are given in Table 1.

Example 4 (Comparative)

A tri-layer film was made according to example 3 with the exception that the overall thickness of the film is approximately 230 μm, and that 10% of the polyester B1 was homogeneously blended into the core polyester A1 just prior to extrusion. The film was subjected to the test procedures described herein. The results are given in Table 1.

Example 5 (Comparative)

A tri-layer film was made according to example 3 with the exception that the overall thickness of the film is 200 μm with the surface layers each being of 17 μm thickness.

Example 6

A 5-layer film made according to the method described herein comprises polyester A1 as the core layer with 10% of polyester B1 homogeneously blended into the core polyester A1 just prior to extrusion; polyester B1 as the outer layers; and polyester C1 as the intermediate layers. The overall film thickness is 130 μm with the outer layers each approximately 10 μm and the intermediate layers each approximately 5 μm. Test results are given in Table 1.

Example 7 (Comparative)

A standard mono-layer film was made from polyester A1 under the filming conditions previously described. The thickness of the mono-layer film is 125 μm. The film was subjected to the test procedures described herein. The results are given in Table 1.

Example 8 (Comparative)

A standard mono-layer film was made from polyester A1 under the filming conditions previously described. The thickness of the mono-layer film is 250 μm. The film was subjected to the test procedures described herein. The results are given in Table 1.

Example 9 (Comparative)

A tri-layer film was made according to example 3 with the exception that the overall thickness of the film is approximately 230 μm, and that none of the polyester B1 was homogeneously blended into the core polyester A1 just prior to extrusion. The film was subjected to the test procedures described herein. The results are given in Table 1.

Example 10 (Comparative)

A 5-layer film made according to the method given herein comprises polyester A1 as the core layer, polyester B1 as the outer surface layers and also as the intermediate layers. The overall thickness of the film is 130 μm with the outer layers each approximately 10 μm and the intermediate layers each approximately 5 μm. Test results are given in Table 1.

TABLE 1

| Example Number | Number of Layers In the Film | Overall thickness (μm) | Thickness of the surface PEN layers (μm) | PEN content in the first layer % (w/w) | Interfacial work of fracture $G_A$ (J/m$^2$) | Thermal ageing (half life at 180° C. of the % ETB in hours) | Oligomer concentration (% by weight) |
|---|---|---|---|---|---|---|---|
| 1 | 3 | 125 | 12 | 5 | >75 | 566 | 0.40 |
| 2 | 3 | 125 | 6 | 5 | >75 | 559 | 0.39 |
| 3 | 3 | 230 | 12 | 5 | >75 | 423 | 0.26 |
| 4 | 3 | ca. 230 | 12 | 10 | >75 | 311 | 0.29 |
| 5 | 3 | ca. 200 | 17 | 5 | 100 | — | — |
| 6 | 5 | 130 | 10 | 10 | 167 | — | — |
| 7 | 1 | 125 | N/A | N/A | N/A | 272 | 0.5–0.6 |
| 8 | 1 | 250 | N/A | N/A | N/A | 222 | 0.5–0.6 |
| 9 | 3 | ca. 230 | 12 | 0 | <10 | 309 | 0.30 |
| 10 | 5 | 130 | 10 | 0 | <10 | — | — |

What is claimed is:

1. A polymeric film suitable for use as insulation consisting essentially of a first layer which comprises (a) a mixture comprising 50–99.9% by weight polyethylene terephthalate (PET) and 0.1–50% by weight of polyethylene naphthalate (PEN) or (b) a copolymer comprising 50–99.9% by weight of ethylene terephthalate units and 0.1–50% by weight ethylene naphthalate units, based on the total weight of the first layer, further comprising a second layer comprising PEN and a third layer comprising PEN, and further comprising a first intermediate layer and a second intermediate layer, wherein each of said intermediate layers comprises (a) a mixture comprising 50–99.9% by weight polyethylene terephthalate (PET) and 0.1–50% by weight polyethylene naphthalate (PEN) or (b) a copolymer comprising 50–99.9% by weight ethylene terephthalate units and 0.1–50% by weight ethylene naphthalate units, based on the total weight of the layer, and wherein the first intermediate layer is interposed between the first and second layers and the second intermediate layer is interposed between the first and third layers.

2. A polymeric film according to claim 1 in which the first layer comprises a copolymer comprising 50–99.9% by weight ethylene terephthalate units and 0.1–50% by weight ethylene naphthalate units.

3. A polymeric film according to claim 1 wherein the first and/or second intermediate layers comprises a copolymer comprising 50–99.9% ethylene terephthalate units and 0.1–50% by weight ethylene naphthalate units.

4. A polymeric film according to claim 1 in which said mixture or said copolymer comprises 0.1 to 30% by weight PEN or ethylene naphthalate units respectively.

5. A polymeric film according to claim 1 in which said mixture or said copolymer comprises 0.5 to 15% by weight PEN or ethylene naphthalate units respectively.

6. A polymeric film according to claim 1 in which the first layer comprises an antioxidant.

7. A polymeric film according to claim 1 which has an organic extractable content of less than 0.5% by weight.

8. A polymeric film according to claim 1 in which the first layer is crystalline.

9. A polymeric film according to claim 1 in which the first and/or second intermediate layer is crystalline.

10. A polymeric film according to claim 1 which is opaque.

11. A method of producing a polymeric film suitable for use as insulation consisting essentially of providing a first layer which comprises (a) a mixture comprising 50–99.9% by weight polyethylene terephthalate (PET) and 0.1–50% by weight polyethylene naphthalate (PEN) or (b) a copolymer comprising 50–99.9% by weight ethylene terephthalate units and 0.1–50% by weight ethylene naphthalate units, based on the total weight of the first layer, further providing a second layer comprising PEN and a third layer comprising PEN, and further providing a first intermediate layer and a second intermediate layer, wherein each of said intermediate layers comprises (a) a mixture comprising 50–99.9% by weight polyethylene terephthalate (PET) and 0.1–50% by weight polyethylene naphthalate (PEN) or (b) a copolymer comprising 50–99.9% by weight ethylene terephthalate units and 0.1–50% by weight ethylene naphthalate units, based on the total weight of the layer, and wherein the first intermediate layer is interposed between the first and second layers and the second intermediate layer is interposed between the first and third layers.

12. A method according to claim 11 wherein the film is produced by co-extrusion.

* * * * *